United States Patent
Jeong et al.

(10) Patent No.: US 9,139,205 B2
(45) Date of Patent: Sep. 22, 2015

(54) SYSTEM AND METHOD FOR DETERMINING WHEN ENGINE HAS ABNORMALLY STOPPED IN A HYBRID ELECTRIC VEHICLE

(71) Applicants: Hyundai Motor Company, Seoul (KR); Kia Motors Corporation, Seoul (KR)

(72) Inventors: Seok Min Jeong, Gyunngi-do (KR); Jeong Soo Eo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 93 days.

(21) Appl. No.: 13/626,140

(22) Filed: Sep. 25, 2012

(65) Prior Publication Data
US 2013/0144473 A1   Jun. 6, 2013

(30) Foreign Application Priority Data
Dec. 1, 2011   (KR) .................... 10-2011-0127961

(51) Int. Cl.
*B60K 6/48* (2007.10)
*B60K 6/445* (2007.10)
(Continued)

(52) U.S. Cl.
CPC ........... *B60W 50/0205* (2013.01); *B60W 10/06* (2013.01); *B60W 20/50* (2013.01); *B60W 30/1884* (2013.01); *B60W 2510/0208* (2013.01); *F02D 29/02* (2013.01); *G01M 15/042* (2013.01)

(58) Field of Classification Search
CPC . B60W 50/0205; B60W 10/06; B60W 20/50; B60W 40/12; B60W 20/00; F02D 29/02; F02D 31/008; G01M 15/00; G01M 15/04; B60K 6/485; B60K 6/543; B60K 6/48; B60K 6/547; B60K 6/365; B60K 6/46; B60L 3/0023; B60L 11/12; B60L 11/04; B60L 6/445; G01F 23/0076; G01F 25/0061
USPC ................ 701/22, 110; 477/3, 99, 5; 73/1.73; 180/65.23; 123/339.11; 290/40 C
See application file for complete search history.

(56) References Cited

U.S. PATENT DOCUMENTS 6,380,641 B2 *   4/2002   Matsubara et al. .......... 290/40 C
6,504,259 B1 *   1/2003   Kuroda et al. ............... 290/40 C
(Continued)

FOREIGN PATENT DOCUMENTS

JP   2001055941 A   2/2001
JP   2004044407 A   2/2004
(Continued)

*Primary Examiner* — Tuan C. To
*Assistant Examiner* — Yuri Kan
(74) *Attorney, Agent, or Firm* — Mintz Levin Cohn Ferris Glovsky and Popeo, P.C.; Peter F. Corless

(57) ABSTRACT

Disclosed is a system and method for determining when an engine of a hybrid electric vehicle has abnormally stalled. In particular, a control unit is configured to determine whether an entry condition has been satisfied before determining whether the engine stalled. Then once it is determined that the engine has stalled, the control unit increase a stall count and monitors whether the engine enters a normal operation state. If the engine enters a normal state, the control unit decreases the stall count. However, when the stall count is greater than or equal to a predetermined threshold value it is determined that the engine is out of order. Thus, it can be clearly identified when an engine has stalled abnormally and over-discharging of the battery may be avoided.

13 Claims, 3 Drawing Sheets

(51) Int. Cl.
  *B60W 50/02* (2012.01)
  *B60W 10/06* (2006.01)
  *B60W 20/00* (2006.01)
  *F02D 29/02* (2006.01)
  *B60W 30/188* (2012.01)
  *G01M 15/04* (2006.01)

(56) References Cited

U.S. PATENT DOCUMENTS

| | | | |
|---|---|---|---|
| 2005/0055152 A1* | 3/2005 | Wakashiro et al. | 701/110 |
| 2005/0072206 A1* | 4/2005 | Cho | 73/1.73 |
| 2005/0079950 A1* | 4/2005 | Colvin | 477/3 |
| 2005/0101433 A1* | 5/2005 | Joe | 477/5 |
| 2005/0145217 A1* | 7/2005 | Takama et al. | 123/339.11 |
| 2006/0090940 A1* | 5/2006 | Ito et al. | 180/65.2 |
| 2008/0132378 A1* | 6/2008 | Bouchon | 477/3 |
| 2008/0238108 A1* | 10/2008 | Edelson et al. | 290/40 C |
| 2013/0143715 A1* | 6/2013 | Bouchon | 477/99 |
| 2013/0144473 A1* | 6/2013 | Jeong et al. | 701/22 |

FOREIGN PATENT DOCUMENTS

| | | |
|---|---|---|
| JP | 2008157095 A | 7/2008 |
| JP | 2011-079478 A | 4/2011 |
| JP | 2011-111977 A | 6/2011 |
| KR | 10-0461275 | 12/2004 |

* cited by examiner

SYSTEM AND METHOD FOR DETERMINING WHEN ENGINE HAS ABNORMALLY STOPPED IN A HYBRID ELECTRIC VEHICLE

CROSS-REFERENCE TO RELATED APPLICATION

This application claims priority to and the benefit of Korean Patent Application No. 10-2011-0127961 filed in the Korean Intellectual Property Office on Dec. 1, 2011, the entire contents of which are incorporated herein by reference.

BACKGROUND OF THE INVENTION (a) Field of the Invention

The present invention relates to a system and method for determining when an engine has abnormally been stopped in a hybrid electric vehicle. More particularly, the present invention relates to a system and method for determining when an engine has been abnormally a hybrid electric vehicle depending upon whether the engine of the hybrid electric vehicle is operating in a normal state or not.

(b) Description of the Related Art

Generally, in a typical internal combustion engine vehicle, the engine of the vehicle does not typical stop and restart. Thus, when the engine does stop, it is unusual. In this case, the system must control the air/fuel ratio in a different way in order to improve the engine's ability to be restarted and to reduce exhaust gas emissions.

On the other hand, in a hybrid electric vehicle the engine is frequently stopped and restarted even in a normal state based upon whether the vehicle is in an idle stop mode, an electric vehicle (EV) driving mode, or a passive run mode. These various modes help to improve the fuel efficiency of the vehicle. As a result, hybrid electric vehicles need to have an additional algorithm for distinguishing between when the engine has been stopped normally and when the engine has been stopped abnormally.

An abnormal engine stop may occur because of a breakdown of a system, a fuel blockage, misfiring, or due to the amount of air supplied to the engine, for example. In most cases, a self-diagnostic algorithm provides breakdown information and countermeasures with respect to the abnormal engine stop. It is difficult, however, to identify an occasional blockage in a fuel line or a contact failure of electric/signal system which cause the engine to stop abnormally using a self-diagnostic algorithm. In fact, a conventional hybrid electric vehicle cannot always confirm whether or not the engine has been stopped abnormally or not since the boundary between a normal stop and an abnormal engine stop is so vague.

Additionally, although hybrid electric vehicles can operate normally using only an alternative energy source (e.g., a motor and a battery) which assist the main energy source (e.g., the engine) when the abnormal engine stop occurs, the alternative energy source is not infinite, and the conventional art may not be able to identify until it is too late that the engine was previously stopped abnormally. As a result, the hybrid electric vehicle may break down eventually and have to be towed when all the alternative energy sources have been used up.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and method for determining when an engine has abnormally stopped in a hybrid electric vehicle having advantages of improving safety of the hybrid electric vehicle by properly distinguishing whether the engine stop is normal or abnormal.

A method for determining whether an engine stop in a hybrid electric vehicle is abnormal according to an exemplary embodiment of the present invention may include: a) determining, by a control unit, whether an entry condition for determining stall of an engine is satisfied; b) determining, by the control unit, whether the engine stalls when the entry condition is satisfied; c) increasing, by the control unit, a stall count when the engine stalls; d) determining, by the control unit, whether the engine has entered a normal operation state; e) decreasing, by the control unit, the stall count when the engine has entered the normal operation state; and f) determining, by the control unit, that the engine is out of order when the stall count is greater than or equal to a predetermined threshold value. More specifically, the entry condition may include a condition that the engine is in the normal operation state. The entry condition may further include a condition that a clutch of the engine is disengaged and the hybrid electric vehicle is in a normal state.

The engine may be determined to stall when the speed of the engine is less than a predetermined threshold speed and a staying time when the speed of the engine is less than the predetermined threshold speed is greater than a predetermined threshold time under predetermined environmental conditions in step b). The environmental conditions may include a coolant temperature, an ambient temperature, an oil temperature, and an atmospheric pressure.

The method may determine whether the engine is in the normal operation state by considering running time of the engine when the vehicle stops and the engine is running in step d). The method may also determine whether the engine is in the normal operation state by considering driving conditions of the vehicle and running time of the engine when the vehicle is driving in the step d). The method may further include g) controlling the engine to not restart when the engine is determined to be out of order in step f).

Furthermore, control unit in the exemplary embodiment of the present invention may be determine that the engine has not stalled when the engine is in the process of starting or it is impossible to start the engine because of a breakdown of a motor/generator in step b).

A system for determining engine stop of a hybrid electric vehicle according to another exemplary embodiment of the present invention may include: an entry condition determination unit that determines whether an entry condition for determining the engine has stalled; a stall determination unit that determines whether the engine has stalled when the entry condition is has been satisfied and increases a stall count when the engine has in fact stalled; and an operation state determination unit that determines whether the engine enters a normal operation state and decreases the stall count when the engine enters the normal operation state. The system determines that the engine is out of order when the stall count is greater than or equal to a predetermined threshold value, and the entry condition includes a condition that the engine is in the normal operation state. The entry condition may further include a condition that a clutch of the engine is disengaged and the hybrid electric vehicle is in a normal state.

The stall determination unit may determine that the engine has stalled when the speed of the engine is less than a predetermined threshold speed and a staying time, when the speed of the engine is less than the predetermined threshold speed, is greater than a predetermined threshold time under predetermined environmental conditions. The environmental conditions may include a coolant temperature, an ambient temperature, an oil temperature, and an atmospheric pressure.

The operation state determination unit may determine whether the engine is in the normal operation state by considering running time of the engine when the vehicle stops and the engine is running. The operation state determination unit may determine whether the engine is in the normal operation state by considering driving conditions of the vehicle and running time of the engine when the vehicle is driving. The system may control the engine not to restart when the engine is determined to be out of order (i.e., to have stopped abnormally).

The stall determination unit may be configured to determine that the engine has not stalled when the engine is in the process of starting or it is impossible to start the engine due to a breakdown of a motor/generator.

According to an exemplary embodiment of the present invention, the present invention can identify an abnormal engine stop of a hybrid electric vehicle. Further, the present invention can improve safety of a hybrid electric vehicle by clearly identifying an abnormal engine stop of the hybrid electric vehicle and preventing over-discharge of the battery.

DETAILED DESCRIPTION OF THE EMBODIMENTS

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

Furthermore, control logic utilized to execute the exemplary embodiments of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Furthermore, the control unit described herein may be embodied as a single control unit or as a plurality of control units without departing from the overall concept and intent of the illustrative embodiment of the present invention.

Figure 1:
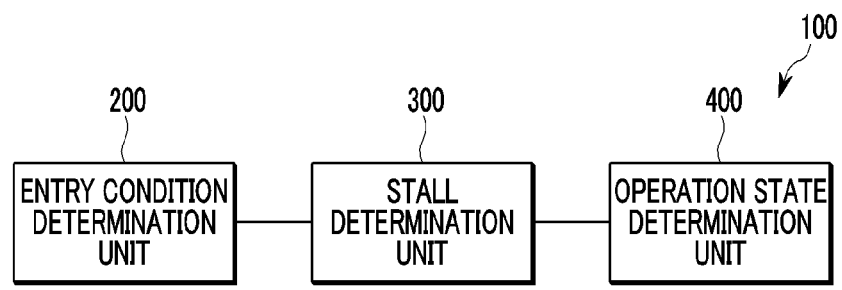
FIG. 1 is a block diagram of a system for determining engine stop of a hybrid electric vehicle according to an exemplary embodiment of the present invention.
Figure 2:
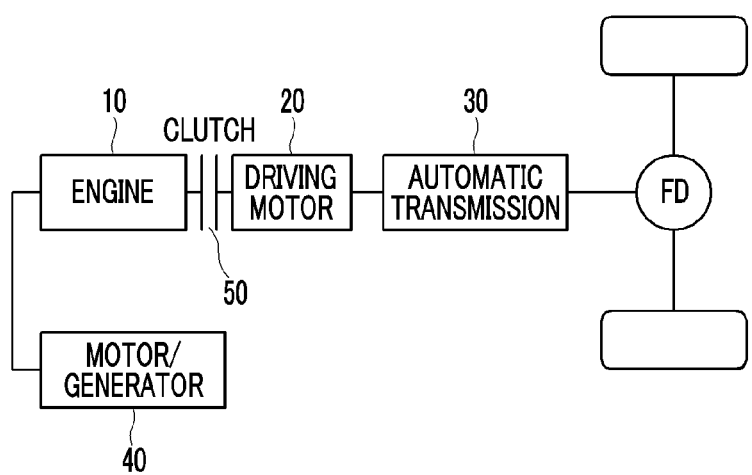
FIG. 2 is a block diagram of a hybrid vehicle drivetrain

FIG. 1 is a block diagram of a system 100 for determining that an engine of a hybrid electric vehicle has stopped abnormally according to an exemplary embodiment of the present invention. As shown in FIG. 1, a system 100 for determining that an engine of a hybrid electric vehicle has stopped abnormally according to an exemplary embodiment of the present invention includes an entry condition determination unit 200 that may be configured to determine whether an entry condition is satisfied. The entry condition may be utilized by the system to determine whether or not the engine has stalled abnormally.

A stall determination unit 300 may be configured to determine whether the engine has stalled when the entry condition has satisfied and increases a stall count once it has been determined that the engine has in fact stalled. An operation state determination unit 400 may be configured to determine whether the engine has entered a normal operation state and as a result, decreases the stall count when the engine enters the normal operation state. The entry condition determination unit initially determines whether the entry condition is satisfied before determining whether the engine stalls.

In one or more exemplary embodiments, the entry condition may include a condition that i) the engine is in the normal operation state, ii) a clutch of the engine is disengaged, and iii) the hybrid electric vehicle is in a normal state.

In one or more exemplary embodiments, the entry condition may further include a condition that iv) a control command of the clutch is less than or equal to a predetermined value, v) actual hydraulic pressure of the clutch is maintained at less than or equal to a predetermined value for a predetermined time, or vi) the phase of the clutch is disengaged.

As mentioned above, in the exemplary embodiment of the present invention, the entry condition includes a condition that i) the engine is in the normal state. This means that the engine is normally started and maintaining equal to or over the idle state. Because the present invention is a system for determining has stopped abnormally by detecting whether or not the engine has stalled while the engine is in the normal operation state, the engine has to operate normally in the entry condition.

The entry condition may include a condition that ii) the clutch of the engine is disengaged. In this case, the system determines whether the engine stalls when the clutch is disengaged, and the system determines whether the engine stalls when the clutch is engaging or is engaged.

A disengaged state of the clutch is a state in which both ends of the clutch such as an input shaft and an output shaft are physically separated and do not interfere with each other. A engaging state of the clutch is a state in which both ends of the clutch begin to rub each other and the difference between the speeds of the both ends is greater than or equal to a certain value. An engaged state of the clutch is when 100% of a torque inputted from the input shaft is delivered to the output shaft through the clutch being completely engaged.

In some hybrid vehicles the engine 10, a driving motor (i.e., the electric motor) 20, and an automatic transmission 30 are arranged in a line. Particularly, the engine 10 and the driving motor 20 communicate with each other to transfer power by interposing the clutch 50 between the engine 10 and the driving motor 20, and the driving motor 20 is directly connected to the automatic transmission 30. Further, a motor/generator 40 which provides torque to the engine 10 during initial acceleration of vehicle is connected to the engine 10.

In the above case, a drive shaft is driven by the driving motor 20 when the clutch is disengaged, and the drive shaft is driven by the engine 10 and the driving motor 20 when the clutch is engaging or is engaged.

When the clutch of the engine is in the engaging or is engaged, the driving force of the engine is transmitting to the drive shaft. If the vehicle were to restart the engine after the vehicle has stalled while the clutch is still engaged, then the vehicle may be shocked or "jump." Therefore, the stall determination unit does not make any determinations as to the stall state of the engine while the clutch is engaged or being engaged. As a result, according to the exemplary embodiment of the present invention, the entry condition is satisfied only when the clutch of the engine is disengaged, to determine whether the engine has stalled abnormally without shocking the hybrid electric vehicle.

Further, the entry condition may include a condition in which the hybrid electric vehicle is in the normal state. This is because each part of the hybrid electric vehicle is typically in the normal state so as to determine the engine stall without the effects of other causes.

A control portion which generally controls the hybrid electric vehicle receives state information from each part of the hybrid electric vehicle such as the control unit, and determines that the system is in the hybrid electric vehicle ready state (HEV READY) when all parts of the hybrid electric vehicle are in a normal state. The hybrid electric vehicle is provided with a hybrid control unit (HCU), and each part of the hybrid electric vehicle may have its own control unit. For example, an engine control unit (ECU) generally controls the engine of the hybrid electric vehicle, a motor control unit (MCU) may control the operation of the driving motor (including an inverter), a transmission control unit (TCU) may control the transmission such as a continuously variable transmission (CVT), a battery management system (BMS) may monitor and administer the battery, and a full auto temperature controller (FATC) which may control the inside temperature.

The control portion determines the hybrid electric vehicle to be in the normal state when all of the above-mentioned control units are operating in a normal state. The stall determination unit 300 then determines whether the engine has stalled when an entry condition is satisfied, and the stall determination unit 300 increases a stall count when the engine stalls.

In one or more exemplary embodiments, the stall determination unit 300 determines the engine has stalled when the speed of the engine is less than a predetermined threshold speed and a staying time, when the speed of the engine is less than the predetermined threshold speed, is greater than a predetermined threshold time under predetermined environmental conditions. The environmental conditions may include at least one of a coolant temperature, an ambient temperature, an oil temperature, and an atmospheric pressure. The environmental conditions can be set in advance.

For example, the stall determination unit 300 determines the engine to have stalled when the speed of the engine is less than a predetermined threshold speed under a predetermined coolant temperature, and the staying time in the state in which the speed of the engine is less than the predetermined threshold speed is greater than a predetermined threshold time for that predetermined coolant temperature. Further, the environmental conditions such as the coolant temperature, the ambient temperature, the oil temperature, or the atmospheric pressure may be set within a predetermined range after the engine starts normally.

Meanwhile, the stall determination unit 300 does not determine that the engine has stalled when the engine is in a process of starting or when it is impossible to start the engine because of a breakdown of the motor/generator. This is because the present invention determines whether the engine has stalled abnormally once it has been successfully started and is normally operating. Therefore, the stall determination unit does not determine the engine stall when the engine is in the process of starting or it is impossible to start the engine because of a breakdown of the motor/generator.

The operation state determination unit 400 determines whether the engine enters the normal operation state. The operation state determination unit 400 determines the state of the engine continuously because the engine may return to a normal operation state from the stall state even once the engine has stalled.

In one or more exemplary embodiments, when the vehicle stops and the engine is running, the operation state determination unit 400 determines whether the engine is operating in a normal operation state by considering the running time of the engine. Furthermore, in one or more exemplary embodiments, when the vehicle is driving, then the operation state determination unit 400 determines whether the engine is in the normal operation state by considering driving conditions of the vehicle and running time of the engine.

The operation state determination unit 400 decreases the stall count determined by the stall determination unit 300 when the engine enters the normal operation state, and the operation state determination unit 400 maintains the stall count determined by the stall determination unit 300 when the engine remains in the stall state.

The system determines the engine is out of order when the stall count is greater than or equal to a predetermined threshold value. The threshold value can be differently set by considering the type of engine or the state and the type of hybrid electric vehicle. The system may prevent the engine from restarting via e.g., a hybrid control unit (HCU) when the engine is determined to be out of order. This is because, when the system tries to repeatedly restart the engine even though the engine is out of order due to the engine abnormally stopping, then the vehicle may become impossible to operate by over-discharging of the battery and using all the energy of the vehicle to attempt to restart the engine.

The method for determining engine stop of a hybrid electric vehicle according to an exemplary embodiment of the present invention will now be described with reference to FIG. 3.

Figure 3:
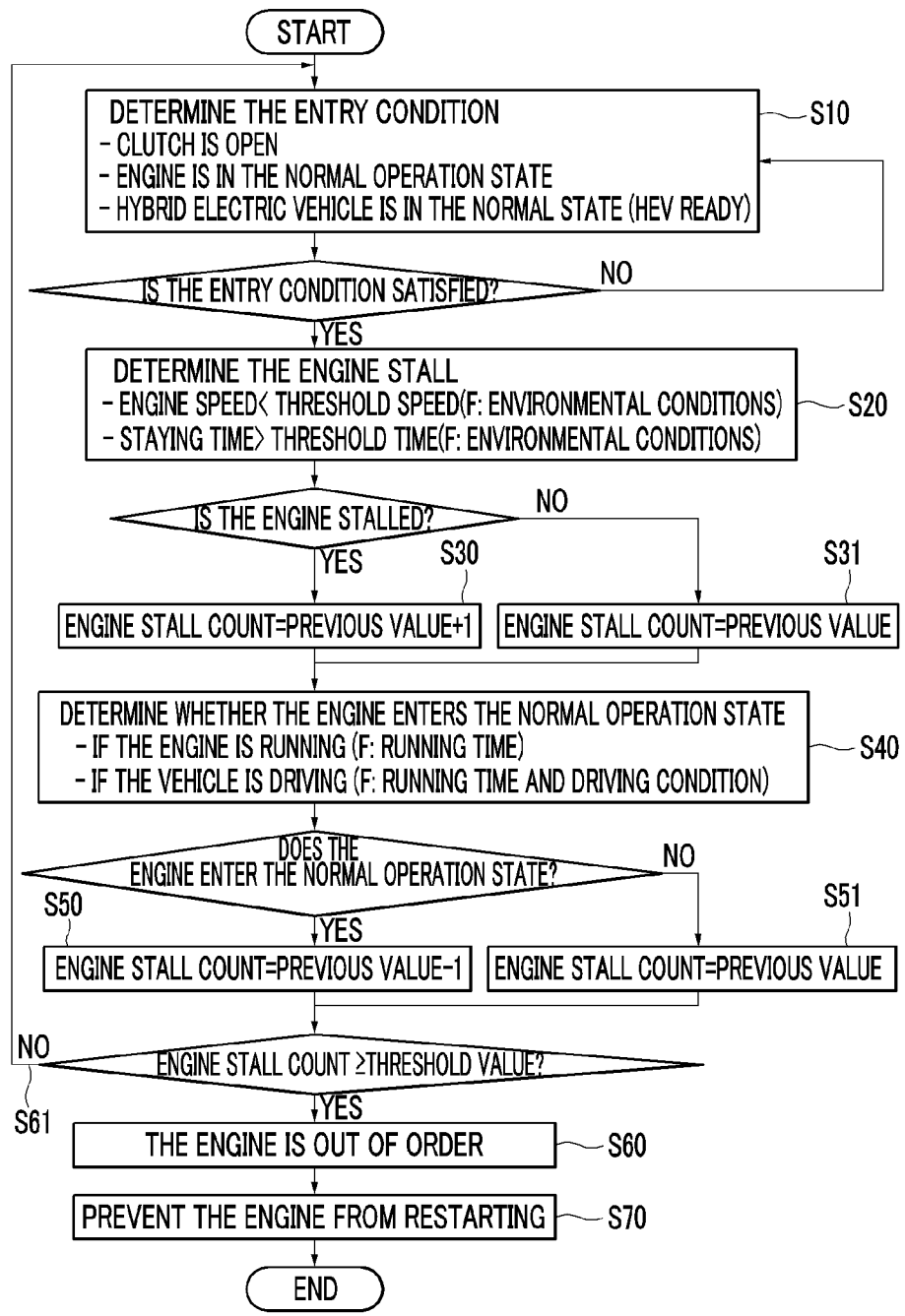
FIG. 3 is a flowchart of a method for determining engine stop of a hybrid electric vehicle according to an exemplary embodiment of the present invention.

FIG. 3 is a flowchart of a method for determining that an engine of a hybrid electric vehicle has stopped abnormally according to an exemplary embodiment of the present invention. As shown in FIG. 3, the method for determining that an engine of a hybrid electric vehicle has stopped abnormally according to an exemplary embodiment of the present invention may include a) determining whether an entry condition for determining whether the engine has stalled is satisfied in step S10, b) determining whether the engine has actually stalled in step S20 when the entry condition is satisfied, c) increasing a stall count in step S30 when the engine stalls, d) determining whether the engine has since entered a normal operation state since the engine has last stalled in step S40, e) decreasing the stall count in step S50 when the engine has entered a normal operation state, and f) determining that the engine is out of order in step S60 when the stall count is greater than or equal to a predetermined threshold value. In particular, an entry condition determination unit determines whether the predetermined entry condition is satisfied in step S10, before determining whether the engine has stalled or not.

According to an exemplary embodiment shown in FIG. 3, the entry condition may be satisfied when i) the engine is in the normal operation state, ii) a clutch of the engine is disengaged, and iii) the hybrid electric vehicle is in the normal state such as a hybrid electric vehicle ready (HEV READY) state. In one or more exemplary embodiments, the entry condition may further include a condition that iv) a control command of the clutch is less than or equal to a predetermined value, v) actual hydraulic pressure of the clutch is maintained at less than or equal to a predetermined value for a predetermined time, or vi) the phase of the clutch is disengaged.

According to an exemplary embodiment of the present invention, the entry condition includes a condition that i) the engine is in the normal state. Because the present invention is a system for determining abnormal engine stop caused by engine stall while the engine is operating normally, the engine itself has to operate normally in order for the illustrative embodiment of the present invention to be applied.

In one or more exemplary embodiments, the entry condition may include a condition that ii) the clutch of the engine is disengaged. That is, the system determines whether the engine has stalled when the clutch is disengaged, and the system does not determine whether the engine has stalled when the clutch is engaging or is engaged. This is because, if the vehicle were to restart the engine when the clutch of the engine is engaging or is engaged due to the engine stalling abnormally, the driving force of the engine would be transmitting to the drive shaft, the vehicle may jump or be shocked, possibly causing damage to the vehicle.

In one or more exemplary embodiments, the entry condition may include iii) a condition in which the hybrid electric vehicle is in the normal state. This is because if each parts of the hybrid electric vehicle are operating normally, the engine most likely has stalled do to an abnormal condition rather than from other causes.

A control portion which generally controls the hybrid electric vehicle receives state information from each part of the hybrid electric vehicle such as the engine control unit (ECU), the motor control unit (MCU), the transmission control unit (TCU), the battery management system (BMS), and the full auto temperature controller (FATC), and determines that the system is in the normal state such as the hybrid electric vehicle ready (HEV READY) when all parts of the hybrid electric vehicle are in the normal state. After that, b) the stall determination unit determines whether the engine stalls at step S20 when the entry condition is satisfied.

In one or more exemplary embodiments, the stall determination unit determines whether the engine has stalled when the speed of the engine is less than a predetermined threshold speed and a staying time in the state that the speed of the engine is less than the predetermined threshold speed is greater than a predetermined threshold time under predetermined environmental conditions. The environmental conditions may include at least one of a coolant temperature, an ambient temperature, an oil temperature, and an atmospheric pressure, and the environmental conditions can be set in advance. Further, the environmental conditions such as the coolant temperature, the ambient temperature, the oil temperature, or the atmospheric pressure may be set to have a value within a predetermined range after the engine starts normally.

As stated above, the stall determination unit determines that the engine has not stalled when the engine is in the process of starting or it is impossible to start the engine because of breakdown of a motor/generator.

As shown in FIG. 3, c) the stall determination unit 300 increases the stall count by 1 in step S30 when the engine stalls. On the other hand, the stall determination unit 300 retains the same stall count in step S31 when the engine does not stall. After that, d) the operation state determination unit determines whether the engine enters the normal operation state in step S40. This is because the engine can return to a normal operation state from the stall state in some cases.

In one or more exemplary embodiments, when the vehicle stops and the engine is running, then the operation state determination unit determines whether the engine has entered the normal operation state by considering the running time of the engine. When the vehicle is driving, then the operation state determination unit may determine whether the engine is in the normal operation state by considering driving conditions of the vehicle and running time of the engine.

In particular, the operation state determination unit decreases the stall count by 1 in step S50 when the engine enters the normal operation state, and the operation state determination unit maintains the stall count in step S51 which is determined in step c) when the engine is still in the stall state. The system determines that the engine is out of order in step S60 when the stall count is greater than or equal to a predetermined threshold value. The threshold value can be set differently by considering the type of engine or the state and type of hybrid electric vehicle. When the stall count is less than the predetermined threshold value, then the step a) to e) will be repeated again by returning to step a) in step S61.

The control portion, such as the HCU, controls the system of the hybrid electric vehicle to prevent the engine from restarting in step S70 when the engine is determined to be out of order. That is, when the system repeatedly tries to restart the engine even though the engine is out of order due to an abnormally stalled engine, the vehicle inadvertently overdischarge of the battery.

According to an exemplary embodiment of the present invention, the present invention can clearly identify the when an engine of the hybrid electric vehicle has stalled or has been abnormally stopped. Further, the present invention can prevent over-discharge of the battery by clearly identifying the abnormal engine stop of the hybrid electric vehicle and preventing the engine from repeatedly attempting to restart when the engine has been abnormally stopped.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for determining when an engine of a hybrid electric vehicle has stalled abnormally, comprising:
   a) determining, by a control unit, whether an entry condition is satisfied;
   b) determining, by the control unit, whether the engine has stalled abnormally only while the entry condition is satisfied, wherein the engine has stalled when a speed of the engine is less than a predetermined threshold speed and a staying time while the speed of the engine is less than the predetermined threshold speed is greater than a predetermined threshold time;
   c) increasing, by the control unit, a stall count in response to the engine stalling, the stall count representing a number of occurrences of stalling in the engine;

d) determining, by the control unit, whether the engine reenters a normal operation state;

e) decreasing, by the control unit, the stall count when the engine reenters the normal operation state; and f) determining, by the control unit, that the engine is out of order when the stall count is greater than or equal to a predetermined threshold value, wherein the entry condition includes a condition that the engine is in the normal operation state, a clutch of the engine is disengaged, and the hybrid electric vehicle is in a normal state.

2. The method of claim 1, wherein environmental conditions in step b) include at least one of a coolant temperature, an ambient temperature, an oil temperature, and an atmospheric pressure.

3. The method of claim 1, further comprising:
determining, the control unit, whether the engine is in the normal operation state based on running time of the engine when the vehicle stops and the engine is running in step d).

4. The method of claim 1, further comprising:
determining, the control unit, whether the engine is in the normal operation state based on driving conditions of the vehicle and running time of the engine when the engine is running in step d).

5. The method of claim 1, further comprising:
g) preventing, by the control unit, the engine from restarting when the engine is determined to be out of order in step f).

6. The method of claim 5, further comprising:
determining, the control unit, that the engine has not stalled when the engine is in the process of starting or is not starting because of a breakdown of a motor/generator in step b).

7. A system for determining engine stop of a hybrid electric vehicle, comprising:
at least a control unit including an entry condition determination unit, a stall determination unit, and an operation state determination unit;

the entry condition determination unit configured to determine whether an entry condition for determining stall of the engine has been satisfied;

the stall determination unit that configured to determine whether the engine has stalled only the entry condition is satisfied and increases a stall count when the engine has stalled, the stall count representing a number of occurrences of stalling in the engine, wherein the stall determination unit is configured to determine that the engine has stalled when a speed of the engine is less than a predetermined threshold speed and a staying time while the speed of the engine is less than the predetermined threshold speed is greater than a predetermined threshold time; and the operation state determination unit configured to determine whether the engine has entered a normal operation state and decreases the stall count when the engine enters the normal operation state, wherein the system determines that the engine is out of order when the stall count is greater than or equal to a predetermined threshold value, and the entry condition includes a condition that the engine is in the normal operation state, a clutch of the engine is disengaged, and the hybrid electric vehicle is in a normal state.

8. The system of claim 7, wherein environmental conditions during operation of the stall determination unit include at least one of a coolant temperature, an ambient temperature, an oil temperature, and an atmospheric pressure.

9. The system of claim 7, wherein the operation state determination unit determines whether the engine is in the normal operation state based on running time of the engine when the vehicle stops and the engine is running.

10. The system of claim 7, wherein the operation state determination unit determines whether the engine is in the normal operation state based on driving conditions of the vehicle and running time of the engine when the vehicle is driving.

11. The system of claim 7, wherein the system prevents the engine from restarting when the engine is determined to be out of order.

12. The system of claim 7, wherein the stall determination unit is configured to determine that the engine has not stalled when the engine is in the process of starting or the engine is not able to start because of a breakdown of a motor/generator.

13. A non-transitory computer readable medium containing program instructions executed by a processor or controller, the computer readable medium comprising:
program instructions that determine whether an entry condition is satisfied;

program instructions that determine whether the engine has stalled abnormally only while the entry condition is satisfied, wherein the engine has stalled when a speed of the engine is less than a predetermined threshold speed and a staying time while the speed of the engine is less than the predetermined threshold speed is greater than a predetermined threshold time;

program instructions that increase a stall count in response to the engine stalling, the stall count representing a number of occurrences of stalling in the engine;

program instructions that determine whether the engine reenters a normal operation state;

program instructions that decrease the stall count when the engine reenters the normal operation state; and program instructions that determine that the engine is out of order when the stall count is greater than or equal to a predetermined threshold value, wherein the entry condition includes a condition that the engine is in the normal operation state, a clutch of the engine is disengaged, and the hybrid electric vehicle is in a normal state.

\* \* \* \* \*